United States Patent
Mills et al.

(10) Patent No.: US 10,217,138 B1
(45) Date of Patent: Feb. 26, 2019

(54) SERVER-SIDE ADVERTISEMENT INJECTION

(71) Applicant: Amazon Technologies, Inc., Reno, NV (US)

(72) Inventors: Brent Robert Mills, Seattle, WA (US); Dan Catalin Teodorescu, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 714 days.

(21) Appl. No.: 13/752,947

(22) Filed: Jan. 29, 2013

(51) Int. Cl.
*G06Q 30/02* (2012.01)

(52) U.S. Cl.
CPC ..... *G06Q 30/0269* (2013.01); *G06Q 30/0251* (2013.01); *G06Q 30/0264* (2013.01)

(58) Field of Classification Search
CPC ........... G06Q 30/0269; G06Q 30/0255; G06Q 30/0267; G06Q 30/0271; G06Q 30/0251; G06Q 30/0256
USPC ......... 705/14.66, 14.53, 14.64, 14.72, 14.49, 705/14.67, 14.54, 26.62, 26.7
See application file for complete search history.

(56) References Cited

U.S. PATENT DOCUMENTS

| | | | | |
|---|---|---|---|---|
| 8,234,350 B1 * | 7/2012 | Gu | ................. | H04N 21/234309 709/203 |
| 8,468,056 B1 * | 6/2013 | Chalawsky | ........ | H04N 21/2547 705/14.41 |
| 8,769,151 B2 * | 7/2014 | Brown | ................... | G06Q 30/02 709/246 |
| 9,066,138 B1 * | 6/2015 | Kraiman | ............... | H04N 21/458 |
| 2005/0278377 A1 * | 12/2005 | Mirrashidi | ........... | G06Q 10/107 |
| 2007/0038567 A1 * | 2/2007 | Allaire | ............... | G06Q 30/0239 705/50 |
| 2007/0118873 A1 * | 5/2007 | Houh | ................. | G06F 17/30746 725/136 |
| 2008/0010117 A1 * | 1/2008 | Oliveira | ................. | G06Q 30/02 705/26.1 |
| 2008/0103884 A1 * | 5/2008 | Blinnikka | .............. | G06Q 30/02 705/14.69 |

(Continued)

OTHER PUBLICATIONS

Advanced Access Content System, Revision 0.951 Final, Jan. 12, 2010 (Year: 2010).*

(Continued)

*Primary Examiner* — David J Stoltenberg
(74) *Attorney, Agent, or Firm* — Thomas | Horstemeyer, LLP; Michael J. D'Aurelio; Jason M. Perilla (57) ABSTRACT

Aspects of server-side advertisement injection are described. In one embodiment, a computing device includes logic that receives a request for content from a client device. The logic identifies a targeted advertisement for a user of the client device based on information in the request. The logic further obtains a manifest file associated with the requested content, generates a second manifest file based on a combination of the first manifest file and the targeted advertisement, and transmits the second manifest file to the client device. Because the second manifest file includes references to clips of the content and the targeted advertisement, the client device can play back the content and advertisement without the necessary processing overhead required to manage client-side buffering and insertion of the advertisement within the content.

20 Claims, 8 Drawing Sheets

(56) References Cited

U.S. PATENT DOCUMENTS

| | | | |
|---|---|---|---|
| 2008/0188209 A1* | 8/2008 | Dorogusker | G06Q 30/0241 455/414.2 |
| 2008/0207137 A1* | 8/2008 | Maharajh | G06F 17/30035 455/74 |
| 2009/0063280 A1* | 3/2009 | Wurster | G06Q 30/02 705/14.73 |
| 2009/0106082 A1* | 4/2009 | Senti | G06Q 30/02 705/7.33 |
| 2009/0222332 A1* | 9/2009 | Smith | G06Q 30/02 705/14.72 |
| 2010/0205049 A1* | 8/2010 | Long | G06Q 30/02 705/14.5 |
| 2011/0022471 A1* | 1/2011 | Brueck | G06Q 30/02 705/14.61 |
| 2011/0145858 A1* | 6/2011 | Philpott | G06Q 30/02 725/32 |
| 2011/0246621 A1* | 10/2011 | May, Jr. | H04N 7/17318 709/219 |
| 2011/0246623 A1* | 10/2011 | Pantos | H04L 65/1083 709/219 |
| 2011/0246661 A1* | 10/2011 | Manzari | G06Q 30/02 709/231 |
| 2011/0307781 A1* | 12/2011 | Sood | G11B 27/34 715/716 |
| 2012/0047542 A1* | 2/2012 | Lewis et al. | 725/97 |
| 2012/0072286 A1* | 3/2012 | Kilar | G06Q 30/02 705/14.55 |
| 2012/0158492 A1* | 6/2012 | Ye | G06Q 30/0241 705/14.49 |
| 2012/0167132 A1* | 6/2012 | Mathews | H04N 21/25808 725/32 |
| 2012/0198492 A1* | 8/2012 | Dhruv et al. | 725/32 |
| 2012/0215878 A1* | 8/2012 | Kidron | G06F 17/30867 709/213 |
| 2012/0216121 A1* | 8/2012 | Lin | H04N 21/234327 715/721 |
| 2012/0236201 A1* | 9/2012 | Larsen et al. | 348/468 |
| 2012/0239496 A1* | 9/2012 | Clarke-Martin et al. | 705/14.49 |
| 2012/0254456 A1* | 10/2012 | Visharam | H04N 21/2343 709/231 |
| 2012/0317303 A1* | 12/2012 | Wang | H04L 65/4076 709/231 |
| 2013/0080268 A1* | 3/2013 | Gordon et al. | 705/14.73 |
| 2013/0091521 A1* | 4/2013 | Phillips | H04N 21/23424 725/35 |
| 2013/0166580 A1* | 6/2013 | Maharajh | H04L 65/605 707/758 |
| 2013/0173526 A1* | 7/2013 | Wong | H04N 21/458 706/54 |
| 2013/0198328 A1* | 8/2013 | Green | H04L 67/02 709/217 |
| 2013/0282915 A1* | 10/2013 | Patel et al. | 709/231 |
| 2014/0040026 A1* | 2/2014 | Swaminathan et al. | 705/14.53 |
| 2014/0052770 A1* | 2/2014 | Gran | H04N 21/26258 709/203 |
| 2014/0150019 A1* | 5/2014 | Ma | G06Q 30/0251 725/34 |
| 2014/0189139 A1* | 7/2014 | Cheng | H04L 65/60 709/231 |

OTHER PUBLICATIONS

Dynamic Adaptive Streaming over HTTP—Standards and Design Principles, Thomas Stockhammer, MMSys'11, Feb. 23-25, 2011, San Jose, California, USA. Copyright 2011 ACM 978-1-4503-0517-4/11/02.*

* cited by examiner

SERVER-SIDE ADVERTISEMENT INJECTION

BACKGROUND

Computing devices, especially mobile devices such as tablets, smartphones, and electronic book readers, are being widely adopted by users. Client devices are being relied upon to render content requested for playback. It is now common for a client device to render various types of media content such as video and audio, among other files. When a client device requests content from another computer, the computer may provide the content as part of a content stream, and the client device may provide playback of the content via a display and/or speakers, for example.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Client devices are relied upon to render media content requested for playback by users. The media content is typically requested and streamed from a server computer over a data network. In certain cases, a client device may execute an application for playback of requested content and insertion of advertisements within the content. For example, when a client device requests content from a server computer, the computer may provide the content as part of a content stream, and the client device may seek to insert advertisements at certain points within the content stream and generate revenue based on playback of the advertisements.

It is noted that several types of client devices have entered the market, and the client devices generally vary in media playback functionalities. Similarly, the client devices vary in operating system type, media playback software, computing resources, and other factors. Because several types of client devices exist, some clients include client-side software for insertion of advertisements within requested content streams for ad-related revenue generation. This client-side software may provide the function of buffering and interleaving a requested content stream with an advertisement stream, at the cost of high development and processing overhead for the client-side software.

According to aspects of the embodiments described herein, a manifest file may be provided in response to a request for content. In various embodiments, the manifest file comprises references to clips of the requested content, with references to clips of one or more advertisements inserted within or among the references to clips of the requested content. In turn, a client device relies upon the manifest file to reference, request, and playback each of the clips in a certain order for playback, with clips of the one or more advertisements inserted among the clips of the requested content. Because the manifest file is generated at a computer and the client device does not need to perform the functions of buffering and interleaving content and advertisement streams, client-side software may be simplified across various manufacturers and models of client devices. Thus, the scalability of content playback across client devices of various manufacturers can be simplified.

In the following discussion, a general description of the system and its components is provided, followed by a discussion of the operation of the same.

Figure 1:
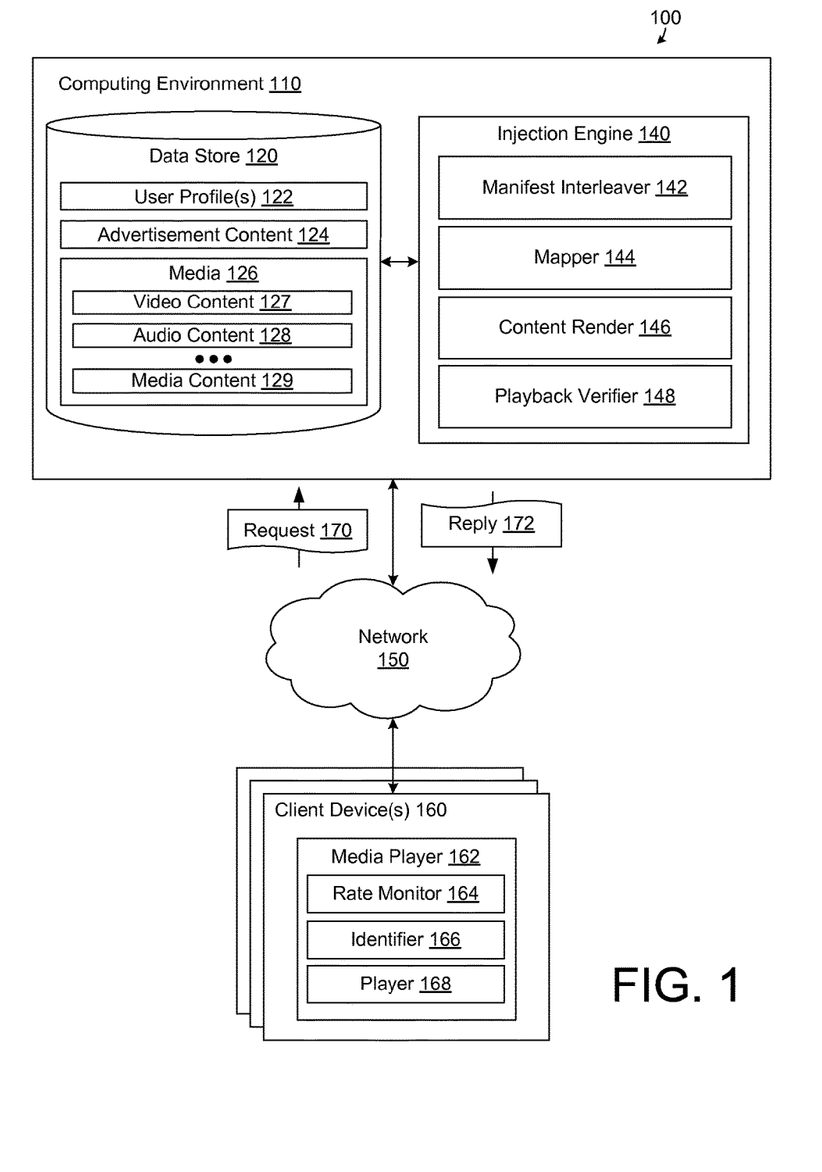
FIG. 1 is a drawing of a networked environment for server-side advertisement injection according to various embodiments of the present disclosure.

FIG. 1 is a drawing of a networked environment 100 for server-side advertisement injection according to various embodiments of the present disclosure. The networked environment 100 comprises a computing environment 110, a network 150, and a client device 160. The network 150 may comprise, for example, the Internet, intranets, extranets, wide area networks (WANs), local area networks (LANs), wired networks, wireless networks, other suitable networks, or combinations thereof. It is noted that the computing environment 110 may communicate with the client device 160 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 150, without limitation.

The computing environment 110 may comprise a computer or other computing device. In certain embodiments, the computing environment 110 may comprise one or more computing devices arranged, for example, in one or more server or computer banks. The computing device or devices may be located at a single installation site or distributed among different geographical locations. For example, the computing environment 110 may include a plurality of computing devices that together comprise a cloud computing resource, a grid computing resource, and/or other distributed computing arrangement. In some cases, the computing environment 110 may comprise an elastic computing resource where an allotted capacity of processing, network, storage, or other computing-related resources varies over time.

In various embodiments, the computing environment 110 comprises and executes applications or functional logic, including the data store 120 and injection engine 140, among other elements, to implement aspects of the embodiments described herein. The data store 120 stores various forms and contents of data, data structures, and/or programs, for example, that are accessible to the computing environment 110. The data store 120 may be representative of a plurality of data stores 120 arranged in various configurations at one or multiple geographic locations, among embodiments. In certain aspects, the data stored in the data store 120 is associated with the operation of the various applications and/or functional logic elements described below.

The computing environment 110 comprises and executes applications or functional logic elements that embody the injection engine 140. It is noted that, in certain embodiments, the computing environment 110 may comprise other applications, services, processes, systems, engines, or functionality not discussed in detail herein. The injection engine 140 performs various aspects of server-side advertisement ("ad") injection, as described in further detail below. For example, the injection engine 140 may receive a request 170 for content and contextual information from the client device 160, identify an advertisement based on the contextual information, obtain a manifest file associated with the content identifier, and generate a second manifest file based on the first manifest file and the advertisement. In turn, the computing environment 110 may transmit the second manifest file in a reply 172 to the client device 160 via the network 150, and the client device 160 may request and play the content referenced by the second manifest file.

As illustrated, the injection engine 140 comprises a manifest interleaver 142, a mapper 144, a content renderer 146, and a playback verifier 148. As discussed in further detail below, the manifest interleaver 142 interleaves references to clips of an advertisement among references to clips of requested content. The mapper 144 generates a map of a manifest file, indicating references in the manifest file that corresponds to requested content and advertisements, respectively. The content renderer 146 generates a content stream based on a manifest file, for client devices that are unable to provide playback of content using a manifest file. The playback verifier 148 receives indicators from client devices indicating that clips of advertisements have been requested or played back, and transmits acknowledgments to advertisers that certain advertisements have been viewed.

The data store 120 comprises one or more user profiles 122, advertisement content 124, and media 126. The user profiles 122 comprise profile information associated with various users of client devices, such as the client device 160. Profile information for a user may include information that identifies the user such as a username and password, home address, and telephone number of the user, for example. The profile information may additionally include data related to the behavior of the user, such as the purchasing activity, browsing activity, researching activity, and other activity of the user. This profile information may be compiled by the computing environment 110 to identify ad targeting segments for that user. As one example, the purchasing activity of a user may be relied upon by the computing environment 110 to determine whether to provide an ad for a certain brand of products, depending upon whether the user has recently purchased the brand's products. As another example, a user's interaction or response to a first advertisement may direct the selection of further advertisements for the user. As discussed below, advertisements may include scripts that may be executed to present a link, a button, or other user interface element for interaction with the advertisement. If a user interacts with the user interface element for an advertisement, similar advertisements may be selected for insertion at a later time within the same manifest file.

The advertisement content 124 comprises data related to various advertisements for products and/or services. The advertisements may be provided by product manufacturers and service vendors, for example. It is noted that the advertisement content 124 may include video, audio, and other multimedia or interactive advertisement content. The advertisement content 124 may be periodically updated by the computing environment 110 with new advertisements, and targets of the advertisements may be periodically updated to accurately target ads to certain users.

The media 126 comprises data related to various types of content for playback by users. For example, the media 126 comprises video content 127, audio content 128, media content 129, and potentially other data. The video content 127 may comprise any form of video content such as television shows or movies. The audio content 128 may comprise songs and albums composed by various artists. It is noted that the data store 120 is not limited to storing video and audio content. Instead, the data store 120 may store any type of content desirable for consumption by users, and use of such content is within the scope and spirit of the embodiments described herein. The media content 129 may comprise any content other than video and audio content that may be desirable for consumption by users, such as images and textual (e.g. book or e-book) content, for example.

According to certain aspects of the embodiments described herein, it is noted that the media 126 may be stored as clips in association with a manifest file including references to the clips of the content. A video of a television show stored in the video content 127, for example, may be stored as a plurality of relatively short clips of the television show, and the television show may be stored in association with a manifest file including references to each of the clips of the show. In one example embodiment, content may be stored in the data store 120 in 5 second clips or shorter. Thus, for a television show of 23 minute duration, the show may be stored as several hundred short clips, and a manifest file including a reference to each of the clips may be stored in association with the show. It is noted that the length of individual clips of content is not limited to a particular length, and clips of any time period or length are within the spirit and scope of the embodiments described herein.

According to other aspects, when a client device 160 requests content, the computing environment 110 returns a manifest file listing each of the references to the short clips of the content, rather than returning the content itself. In this case, the client device 160 relies upon the manifest file to reference, request, and play back each of the short clips in a certain order for playback. From the standpoint of a user of the client device 160, the user cannot identify that the content requested has been provided in the manner of short clips, because the client 160 sequences and buffers the clips in order to provide seamless playback of the content.

Additionally, when a client device 160 requests content, the request may be received with contextual information such as a user identifier associated with a profile of a user of the client device 160. Using the user identifier, the injection engine 140 accesses the user profiles 122 to identify a plurality of ad targeting segments of the user. The injection engine 140 may then access the advertisement content 124 and identify at least one advertisement targeted to the user based on the targeting segments. As with the content, the advertisement content 124 may be stored as short clips, and a manifest file including a reference to each of the clips may be stored in association with the advertisement.

After the injection engine 140 has identified one or more advertisements targeted to the user, the manifest interleaver 142 generates a combined manifest file including both references to clips of the requested content and references to clips of the advertisement. Particularly, the manifest interleaver 142 generates a combined manifest file including references to clips of the requested content with references to clips of the advertisement interleaved among the content clips. The combined manifest file is then transmitted by the computing environment 110 to the client device 160 via the network 150. Additional aspects of the injection engine 140 are described in further detail below in connection with FIGS. 2-8.

The client device 160 is representative of a plurality of client devices that may be coupled to the network 150. The client device 160 may comprise, for example, a processor-based system such as a computer system. Each may be embodied in the form of a desktop computer, laptop computer, personal digital assistant, cellular telephone, smartphone, set-top box, music player, web pad, tablet computer system, game console, or electronic book reader, for example, without limitation. The client device 160 may include any type of display device, such as a liquid crystal display (LCD) display, gas plasma-based flat panel display, organic light emitting diode (OLED) display, LCD projector, or other type of display device, etc., and/or speaker(s) for playback of video and audio content, for example.

The client device 160 comprises a media player 162 application or logical element, among other elements. In certain embodiments, the media player 162 relies upon a received manifest file to reference, request, and play back clips of requested content with clips of advertisements interleaved among the clips of content. As illustrated in FIG. 1, the media player 162 comprises rate monitor 164, identifier 166, and player 168 applications or logical elements, among other elements. Aspects of the rate monitor 164, the identifier 166, and the player 168 are described in further detail below in connection with FIGS. 2-8.

Figure 2:
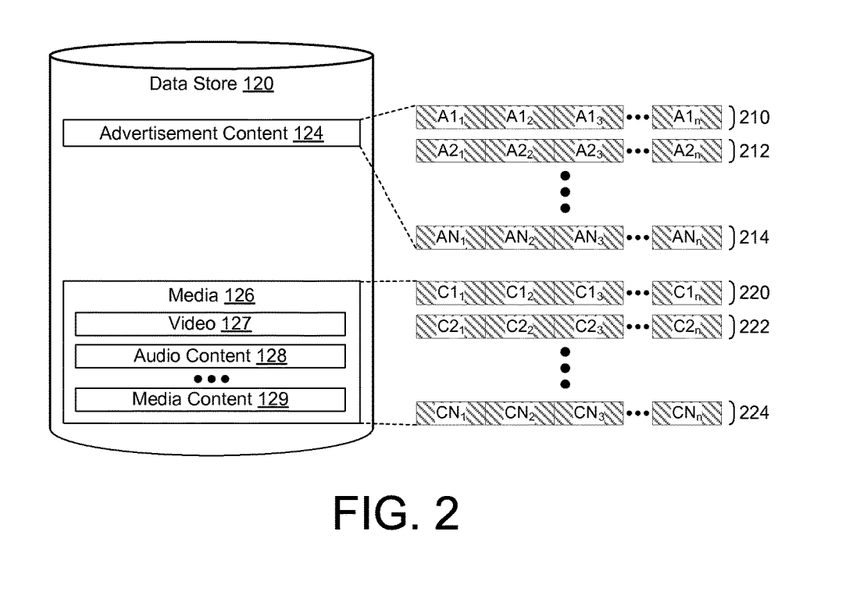
FIG. 2 is a drawing of example contents of a data store of a computing environment in the networked environment of FIG. 1 according to various embodiments of the present disclosure.

Next, a general description of the operation of the various components of the networked environment 100 is provided. To begin, FIG. 2 is a drawing of example contents of a data store of a computing environment in the networked environment of FIG. 1 according to various embodiments of the present disclosure. As illustrated in FIG. 2, the advertisement content 124 comprises various advertisements including advertisements 210, 212, and 214, among others. As illustrated, the advertisement 210 is stored as a plurality of clips $A1_1$-$A1_n$. Similarly, the advertisement 212 is stored as a plurality of clips $A2_1$-$A2_n$, and the advertisement 214 is stored as a plurality of clips $AN_1$-$AN_n$. Thus, a manifest file for the advertisement 210 comprises a listing of references or uniform resource indicators (URIs) referring to locations at which the respective clips $A1_1$-$A1_n$ of the advertisement 210 may be retrieved for playback. Manifest files for the advertisements 212 and 214 are similar in nature to the manifest file for the advertisement 210, but comprise listings of URIs to the clips of the advertisements 212 and 214, respectively.

It is noted that the advertisements 210, 212, and 214 may comprise video, audio, game, textual (e.g. book or e-book) or any other similar type of content, including multimedia and interactive content, without limitation. In one embodiment, the advertisements 210, 212, and 214 include interactive content such as a script in addition to references to clips of advertisements. The script may be executed by the client device 160 to present a link, a button, or other user interface element for interaction with the advertisement.

As also illustrated in FIG. 2, the media 126 comprises various content including content 220, 222, and 224, among others. As illustrated, the content 220 is stored as a plurality of clips $C1_1$-$C1_n$. Similarly, the content 222 is stored as a plurality of clips $C2_1$-$C2_n$, and the content 224 is stored as a plurality of clips $CN_1$-$CN_n$. Thus, a manifest file for the content 220 may comprise a listing of references or uniform resource indicators (URIs) referring to locations at which the respective clips $C1_1$-$C1_n$ of the content 220 may be retrieved for playback. Manifest files for the content 222 and 224 are similar in nature to the manifest file for the content 220, but comprise listings of URIs to the clips of the content 222 and 224, respectively.

It is noted that the content 220, 222, and 224 may comprise video, audio, game, textual (e.g. book or e-book) or any other similar type of content, including multimedia and interactive content, without limitation. In one embodiment, the content 220, 222, and 224 include interactive content such as a script in addition to references to clips of content. The script may be executed by the client device 160 to present a link, a button, or other user interface element for interaction with the content. It should be appreciated that any advertisement or item of content may be stored as any number of clips, based on parameters of the server-side advertisement injection system. It should also be appreciated that, in various embodiments, the advertisement content 124 and media 126 may comprise any number of advertisement and content items, based on storage capacity of the data store 120.

Figure 3:
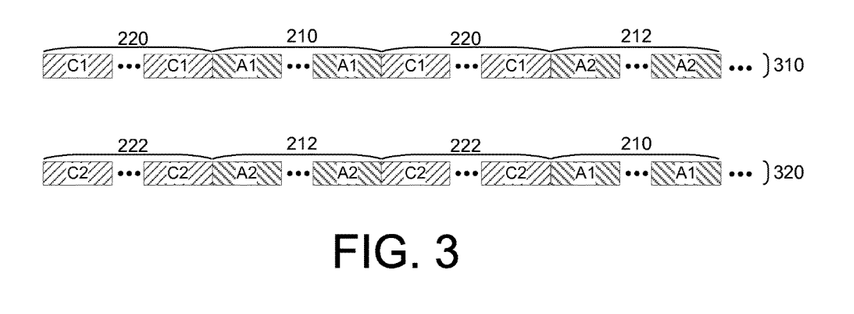
FIG. 3 is a drawing of example manifest files generated by a computing environment in the networked environment of FIG. 1 according to various embodiments of the present disclosure.

FIG. 3 is a drawing of example manifest files generated by a computing environment in the networked environment of FIG. 1 according to various embodiments of the present disclosure. As illustrated in FIG. 3, the manifest file 310 comprises references to clips C1 of the content 220 with references to clips A1 of the advertisement 210 and clips A2 of the advertisement 212 inserted among the C1 clip references. The manifest file 310 may be transmitted by the computing environment 110 to a client device 160, and the client device 160 may reference, retrieve, and playback the clips C1 of the content 220 with the clips of the advertisements A1 and A2, consecutively, as a single stream. Similarly, the manifest file 320 comprises references to clips C2 of the content 222 with references to clips A2 of the advertisement 212 and clips A1 of the advertisement 210 inserted among C2 clip references.

The positions, sequences, and numbers of references to the contents C1 and C2 and the advertisements A1 and A2 in the manifest files 310 and 320 are illustrated by way of example only. The manifest files 310 and 320 are not intended to be drawn to scale, emphasis instead being placed upon clearly illustrating the principles of interleaving references to advertisement clips among references to content clips.

It should be appreciated that any combination of content and advertisement clips may be provided in a manifest file. For example, a manifest file may combine clips from two or more different content items, as a type of playlist or highlights reel, with various clips of one or more advertisements interleaved among them. Further, clips from two or more different content items may also be interleaved among each other, in certain cases. In various embodiments, locations for insertion of references to advertisements among references to content may be specified as a list of points by an owner of the content or an owner of the advertisements, or determined according to an analysis of the content and/or advertisements or other suitable manner.

Further, the manifest files described herein may or may not include an end. In other words, a manifest file may be supplemented or streamed over time as, for example, an open-ended list of references to clips of content and advertisements. In this sense, a manifest file may be continually appended with further references to clips, and a client device may continue to request and play back those clips until media playback is stopped or cancelled. In other embodiments, a manifest file may be supplemented over a certain period of time with an ongoing stream of references to clips, until a final end-of-file or similar endpoint is inserted into the file. Especially in the case where a manifest file is open-ended, a user's interaction or response to a first advertisement may direct the selection of further advertisements for the user. That is, if a user interacts with the user interface element for a certain advertisement, similar advertisements may be selected for insertion within the open-ended manifest file at a later time.

It is noted that each of the manifest files 310 and 320 may be generated by the computing environment 110 in response to a request 170 received from a client device 160. The request may be received from the client device 160 with a contextual or user identifier. The computing environment 110, in turn, accesses the user profiles 122 to identify a plurality of ad targeting segments of the user based on the identifier. Thus, the advertisements 210 and 212 in the manifest files 310 and 320 may be selected by the computing environment 110 as ads targeted to the user. After sending one of the manifest files 310 and 322 to the client device 160 in a reply 172, the player 168 of the client device 160 may reference, request, and play back the content and advertisements identified in the files. According to certain aspects, the media player 162 of the client device 160 does not require any special functions or software to insert advertisements among the content requested. Instead, the media player 162 simply requests and plays each of the clips identified in a manifest file, and the advertisements are automatically inserted based on the nature of the interleaved references to advertisement clips among the clips of the content.

Figure 4:
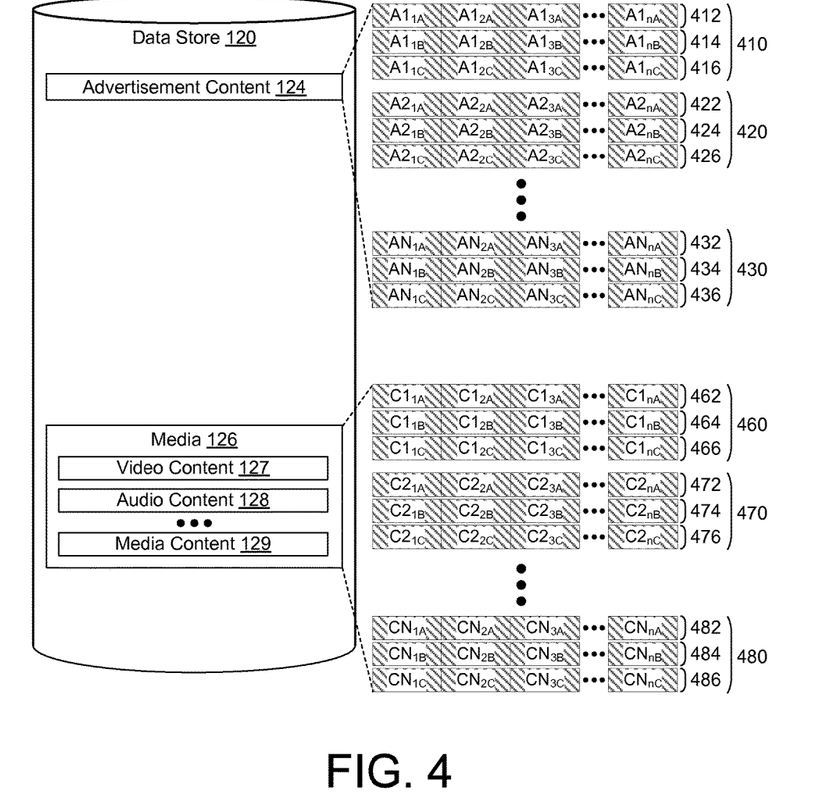
FIG. 4 is another drawing of example contents of a data store of a computing environment in the networked environment of FIG. 1 according to various embodiments of the present disclosure.

FIG. 4 is another drawing of example contents of a data store of a computing environment in the networked environment of FIG. 1 according to various embodiments of the present disclosure. As illustrated in FIG. 4, the advertisement content 124 comprises various advertisements including advertisements 410, 420, and 430, among others. As compared to the advertisement 210 of FIG. 2, the advertisement 410 is stored as references to a plurality of clips $A1_1$-$A1_n$, and also as various streams "A" 412, "B" 414, and "C" 416 of the clips $A1_1$-$A1_n$. Each of the streams 412, 414, and 416 is associated with a respective stream quality. For example, the stream 412 may comprise a high-bitrate stream, the stream 414 may comprise a medium-bitrate stream, and the stream 416 may comprise a low-bitrate stream. Thus, although the clip $A1_{1A}$ comprises the same content as the clip $A1_{1B}$, the clip $A1_{1A}$ comprises a higher quality clip as compared to the clip $A1_{1B}$, and the clip $A1_{1B}$ comprises a higher quality clip as compared to the clip $A1_{1C}$.

The advertisement 420 is also stored as references to a plurality of clips $A2_1$-$A2_n$, and as various streams "A" 422, "B" 424, and "C" 426 of the clips $A2_1$-$A2_n$. Further, the advertisement 430 is stored as a plurality of clips $AN_1$-$AN_n$, and as various streams "A" 432, "B" 434, and "C" 436 of the clips $AN_1$-$AN_n$. Each of the streams 422, 424, 426, 432, 434, and 436 is associated with a respective stream quality, as discussed above. Although references to three levels of quality are illustrated in FIG. 4 for each of advertisements 410, 420, and 430, more or fewer levels of quality may be available. That is, references to more or fewer levels of advertisement quality are within the scope and spirit of the embodiments described herein.

Although the advertisements 410, 420, and 430 are described as including references to high, medium, and low quality clips, it is noted that certain advertisements may not be associated with different clip qualities. In other words, in various embodiments, advertisements 410 and 420 may be referenced by the streams 412, 414, 416, 422, 424, and 426 of varying quality, while only one stream (e.g., stream 434) is available for the advertisement 430. Generally, the computing environment 110 transcodes and stores an advertisement into various stream qualities. However, in certain circumstances, the computing environment 110 may be unable to transcode an advertisement into different qualities before it is interleaved into a manifest file. For example, if an advertisement is retrieved by the computing environment 110 and referenced within a manifest file, the computing environment 110 may have only one quality of clips available for reference, due to the short amount of time between receipt of the advertisement and distribution of references to clips of it.

In FIG. 4, the media 126 comprises various content including content 460, 470, and 480, among others. As compared to the content 220 of FIG. 2, the content 460 is stored as references to a plurality of clips $C1_1$-$C1_n$, and also as various streams "A" 462, "B" 464, and "C" 466 of the clips $C1_1$-$C1_n$. Each of the streams 462, 464, and 466 is associated with a respective stream quality. For example, the stream 462 may comprise a high-bitrate stream, the stream 464 may comprise a medium-bitrate stream, and the stream 466 may comprise a low-bitrate stream. Thus, although the clip $C1_{1A}$ comprises the same content as the clip $C1_{1B}$, the clip $C1_{1A}$ comprises a higher quality clip as compared to the clip $C1_{1B}$.

The content 470 is also stored as a plurality of clips $C2_1$-$C2_n$, and as various streams "A" 472, "B" 474, and "C" 476 of the clips $C2_1$-$C2_n$. Further, the content 480 is stored as a plurality of clips $CN_1$-$CN_n$, and as various streams "A" 482, "B" 484, and "C" 486 of the clips $CN_1$-$CN_n$. Each of the streams 472, 474, 476, 482, 484, and 486 is associated with a respective stream quality, as discussed above. Although references to three levels of quality are illustrated in FIG. 4 for the content 460, 470, and 480, more or fewer levels of quality may be available. That is, references to more or fewer levels of content quality are within the scope and spirit of the embodiments described herein.

Figure 5:
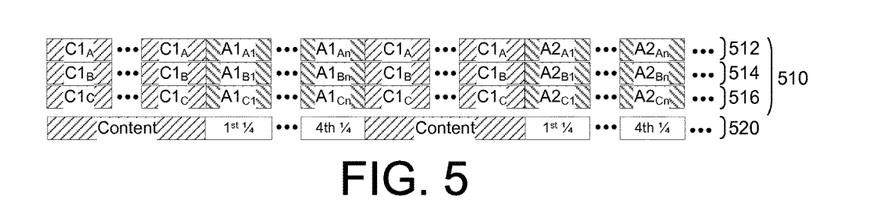
FIG. 5 is a drawing of an example manifest file generated by a computing environment in the networked environment of FIG. 1, including multiple streams of requested content and advertisements, according to various embodiments of the present disclosure.

FIG. 5 is a drawing of an example manifest file generated by a computing environment in the networked environment of FIG. 1, including multiple streams of requested content and advertisements, according to various embodiments of the present disclosure. As illustrated in FIG. 5, the manifest file 510 comprises streams 512, 514, and 516 of differing quality. It is noted that the stream 512 comprises references to "same-content" clips as streams 514 and 516, although at a higher quality or bitrate. In certain embodiments, a media player may reference one of the streams 512, 514, and 516 at a time of playback, depending upon various considerations such as overall network bandwidth and latency, processing availability, and available memory capacity, for example.

As a variation on the manifest file 510, the file 510 may include references to multiple streams of the same requested content C1 but only references to one stream of the advertisement A1, the advertisement A2, or both the advertisements A1 and A2. As one example, the manifest file 510 may include references to multiple streams of the same requested content C1, references to one stream of the advertisement A1, and references to two or more streams of the advertisement A2. In this case, although the content C1 may be requested and played back in high quality, the advertisements A1 and A2 may be requested and played back in a relatively lower quality.

Referring again to FIG. 1, the media player 162 comprises a rate monitor 164. The rate monitor 164 monitors network conditions such as overall network bandwidth and latency, to determine which one of the streams 512, 514, and 516 should be selected based on the conditions. In certain embodiments, the rate monitor 164 may also monitor processing availability and available memory capacity of the client device 160. If the network conditions and/or capacity of the client device 160 permit, the rate monitor 164 may specify that clips from the high quality stream 512 should be requested for playback. Alternatively, if the network conditions and/or capacity is poor, the rate monitor 164 may specify that clips from the low quality stream 516 should be requested for playback. The monitoring of conditions by the rate monitor 164 may be performed in real time, and the selection of one of the streams 512, 514, and 516 may also be performed in real time. Thus, playback of an appropriate stream (i.e., one of streams 512, 514, and 516) may be performed by the media player 162 by simple stream selection without complicated client-side software and high processing requirements. Further, the playback of an appropriate stream by the client device 160 may be achieved in the networked environment 100 without complicated server-side software and processing requirements such as real time transcoding of content and advertisements.

FIG. 5 also illustrates a map 520 of the manifest file 510. As indicated above, the mapper 144 may generate the map 520, which identifies which clips in the manifest file 510 correspond to content and advertisements, respectively. In addition to identifying which of the clips C1, A1, A2, etc. in the manifest file 510 correspond to content and advertisements, the map 520 may also indicate relative quartiles of an advertisement, per clip, for example. That is, the map 520 may indicate that the advertisement clip $A1_{A1}$ is a clip in the $1^{st}$ quartile of a total length of the advertisement A1. Further, the map 520 may indicate that the advertisement clip $A1_{AN}$ is a clip in the $4^{th}$ quartile of the total length of the advertisement A1. In various embodiments, the map 520 may indicate relative positions of content clips and advertisement clips at any resolution of timing. Manifest file maps and the use of manifest file maps by client devices are described in further detail below with reference to FIG. 7. It is noted that other means of indicating relative positions of content clips among advertisement clips may be relied upon, including attributing metadata to the clips themselves, for example.

Figure 6:
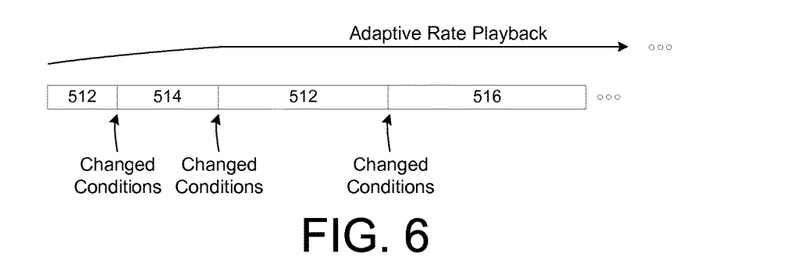
FIG. 6 is a drawing of an example of client device stream selection during playback by a client device in the networked environment of FIG. 1 according to various embodiments of the present disclosure.

FIG. 6 is a drawing of an example of client device stream selection during playback by a client device in the networked environment of FIG. 1 according to various embodiments of the present disclosure. The rate monitor 164 of the client device 160 of FIG. 1 may oversee adaptive rate playback based on various conditions by selecting one of the streams 512, 514, and 516 over time. It is noted that, if conditions permit high quality playback, a client device 160 can select clips from the stream 512 and, when conditions deteriorate, the client device can revert to clips from one of the streams 514 and 516 to compensate for the deteriorated conditions. Thus, rate adaptation according to embodiments described herein can be achieved by selection of clips from an appropriate content stream, and clips from different streams may be selected in any sequence depending upon network and processing conditions.

Figure 7:
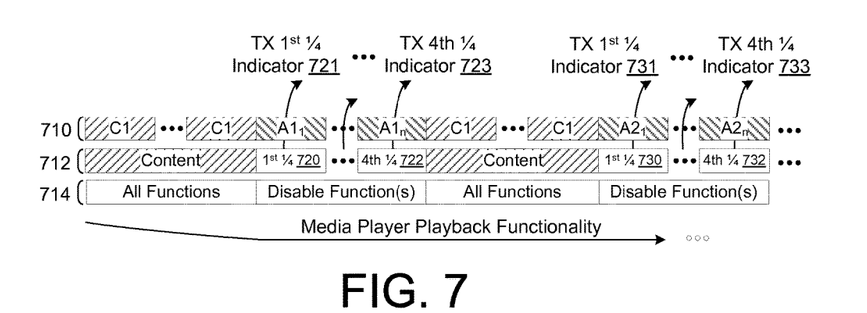
FIG. 7 is a drawing of an example timeline of client device media player functionality in the networked environment of FIG. 1 according to various embodiments of the present disclosure.

FIG. 7 is a drawing of an example timeline of client device media player functionality in the networked environment of FIG. 1 according to various embodiments of the present disclosure. As illustrated in FIG. 7, a manifest 710 and a manifest map 712 are illustrated. The manifest 710 and manifest map 712 may be received by a client device 160 in response to a request for the content C1 from the client device 160. In response to the request, the manifest interleaver 142 generates the manifest 710 and the mapper 144 generates the manifest map 712. In turn, the computing environment 110 returns the manifest 710 and manifest map 712 to the client device 160 for further processing.

As illustrated, the manifest 710 comprises a plurality of clips including clips from the content C1 and clips from advertisements A1 and A2. The manifest map 712 indicates which clips in the manifest 710 correspond to content and advertisements, respectively. Upon receipt of the manifest 710 by the client device 160, the identifier 166 of the client device 160 references the map 712 while the content C1 and advertisements A1 and A2 are requested and played back by the player 168. Thus, the media player 162 of the client device 160 is aware of whether it is currently referencing, requesting, and playing back content or advertisements.

Based on this awareness, the client device 160 can perform certain additional functions. For example, while fast forward functions of the player 168 may be available during playback of the content C1, that function may be disabled during playback of the advertisements A1 and A2, as illustrated at the functionality timeline 714. Thus, playback of the entirety of an advertisement by the media player 162 can be ensured. In certain circumstances, this type of functionality may be required for payment for delivery of the advertisement. In other words, an advertiser may be unwilling to pay for delivery of an advertisement unless it was delivered in its entirety. Alternatively, an advertiser may be willing to pay a premium for delivery of an advertisement delivered in its entirety. During content playback, the media player 162 can enable full functionality of the player 168, as illustrated at the functionality timeline 714. It is noted that the example of disabling/enabling a fast forward function is provided by way of example only, and disabling/enabling other functions or features of the media player 162 is within the scope and spirit of the embodiments described herein.

According to other aspects, the client device 160 can transmit a playback indicator to the computing environment 110 indicating playback of an advertisement, for accounting or other purposes. For example, as illustrated in FIG. 7, upon request and/or playback of the clip $A1_1$ of the advertisement A1, the client device 160 can transmit an indicator 721 to the computing environment 110 that the first quartile (or portion of it) has been requested and/or played back. The client device 160 can recognize the clip $A1_1$ as an advertisement clip based on attributes of the map marker 720. In various embodiments, the indicator 721 may be transmitted upon request of the clip $A1_1$, upon playback start of the clip $A1_1$, or upon playback conclusion of the clip $A1_1$.

In other embodiments, the client device 160 can transmit indicators for each of several clips (or for each clip) of an advertisement A1, when requested or at any time during playback or conclusion of playback of the clips. As illustrated in FIG. 7, upon request and/or playback of the clips $A1_1$, $A1_N$, $A2_1$, and $A2_N$, the client device 160 can transmit a respective indicator 721, 723, 731, and 733 to the computing environment 110 indicating that certain quartiles of the advertisements A1 and A2 have been requested for playback or played back. In various embodiments, the indicators may be transmitted upon clip request, upon clip playback start, or upon clip playback conclusion. The client device 160 may recognize the clips $A1_1$, $A1_N$, $A2_1$, and $A2_N$ as advertisement clips based on attributes of the map markers 720, 722, 730, and 732. The map 712 may indicate quartiles of clips of the advertisements A1 and A2 or, alternatively, another relative or absolute timing reference. According to other features, the client device 160 can transmit playback indicators for clips of content, for accounting or other purposes, at any interval of the clips of content.

At the computing environment 110, the playback verifier 148 receives and accounts for the playback indictors 721, 723, 731, and 733. In various embodiments, the playback verifier 148 communicates a verification to an advertiser that playback of an advertisement has been requested, started, or concluded, for any or all of the clips of the advertisement. In one embodiment, the playback verifier 148 communicates a playback verification at a predetermined time interval after receipt of an indicator from a client device 160 that the last clip of the advertisement has been played back. The predetermined time interval may be determined based on a certain number of content clips being played back after playback of the last clip of the advertisement, for example. In other embodiments, the, playback verifier 148 communicates a playback verification at ¼, ½, and ¼ playback points. However, the timing of verification is not so limited, as other timings are within the scope of the embodiments described herein. Also, it is noted that receipt of playback indicators may be aggregated by the playback verifier and reported as part of a report on the playback of several advertisements, with or without an accompanying statistical analysis.

Figure 8:
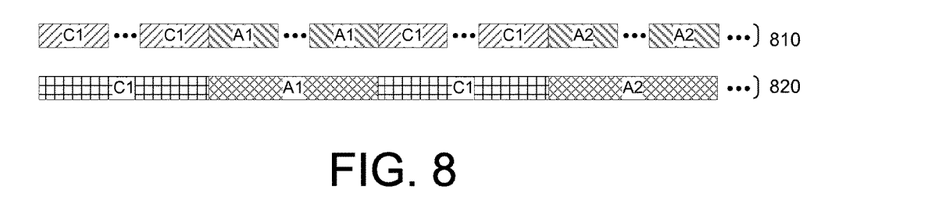
FIG. 8 is a drawing of an example of a manifest file and a content stream rendered by a computing environment in the networked environment of FIG. 1 according to various embodiments of the present disclosure.

FIG. 8 is a drawing of an example of a manifest file and a content stream rendered by a computing environment in the networked environment of FIG. 1 according to various embodiments of the present disclosure. In certain situations, if a client device is unable to reference, request, and receive individual clips of content and advertisements using a manifest file, the content renderer 146 of the computing environment 110 can render a content stream for direct playback by the client device. As illustrated in FIG. 8, for example, upon generation of a manifest file 810 by the manifest interleaver 142, the content renderer 146 can compile and render the clips identified in the file 810 into an integrated content stream 820 of content and advertisements. In turn, the client device 160 can buffer and play the content stream 820 directly.

As with the manifest files, the content stream 820 may or may not include an end. In this sense, the content stream 820 may be continually appended with further content and advertisements until media playback is stopped or cancelled. In this case, a user's interaction or response to a first advertisement may direct the selection of further advertisements for the user. That is, if a user interacts with the user interface element for a certain advertisement, similar advertisements may be selected for insertion within the open-ended content stream 820.

Because it may take some time for the content renderer 146 to compile and render the clips identified in the file 810 into the content stream 820, various techniques may be relied upon to provide a relatively seamless stream of content within a short period of time after a request. In one embodiment, while the content stream 820 is being rendered by the content renderer 146, a short advertisement may be provided to permit some time for rendering. Further, if one user has requested a rendered stream of content and/or advertisements, the content renderer 146 may re-use certain portions of that rendered stream for other users. The other users may be users of a similar ad targeting segment, for example. Additionally, to save rendering time, rather that retrieving and rendering a certain targeted advertisement for a user, an advertisement that was previously rendered for another user may be used in place of the targeted advertisement. In this case, the previously rendered advertisement may be selected based on an ad target segment similar to the advertisement targeted for the primary user.

Figure 9:
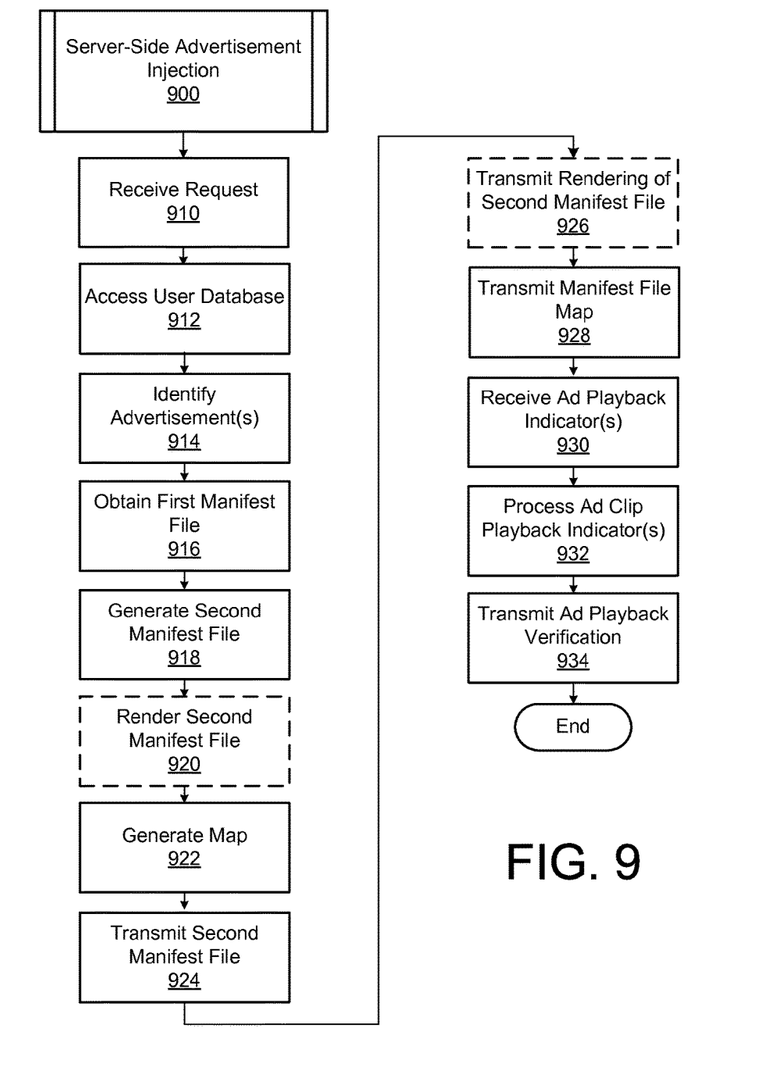
FIG. 9 is a flowchart illustrating an example of functionality implemented by an injection engine executed in a computing environment in the networked environment of FIG. 1 according to various embodiments of the present disclosure.
Figure 10:
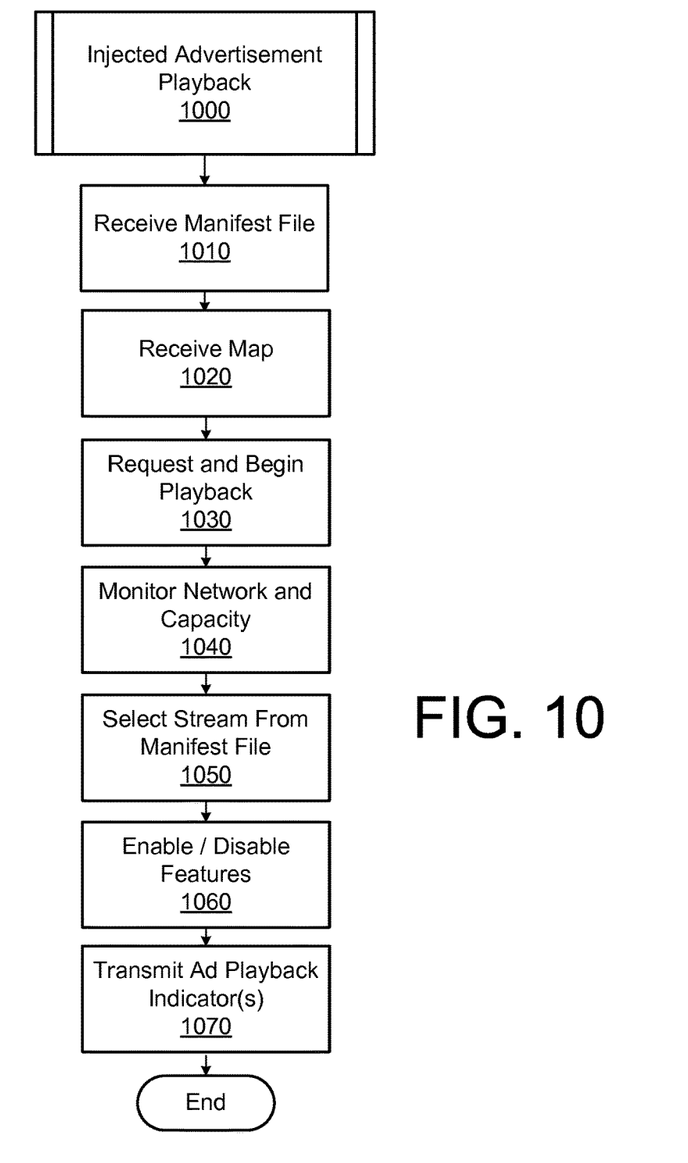
FIG. 10 is a flowchart illustrating an example of functionality implemented by a media player executed in a client device in the networked environment of FIG. 1 according to various embodiments of the present disclosure.

Referring next to FIGS. 9 and 10, flowcharts illustrating an example of processes performed by the computing environment 110 and the client device 160 are provided. It is understood that the flowcharts of FIGS. 9 and 10 provide merely one example of various functional arrangements that may be employed to implement the operations of the computing environment 110 and the client device 160, as described herein. In certain aspects, the flowcharts of FIGS. 9 and 10 may be viewed as depicting an example of steps performed by the computing environment 110 and the client device 160 according to one or more embodiments.

FIG. 9 illustrates a process 900 of server-side advertisement injection according to an example embodiment. At 910, a request for content and contextual information is received. The contextual information may be associated with a profile of a user of a client device. The request may be received by the computing environment 110, for example, from the client device 160. At 912, a user database is accessed to identify a plurality of ad targeting segments for the user of the client device. For example, the user profiles 122 may be accessed according to a user identifier of the received contextual information. Based on a query of the user profiles 122, the plurality of ad targeting segments may be identified so that one or more advertisements targeted to the user may be identified at 914. The advertisements may be identified and obtained from among the advertisement content 124 as one or more advertisement manifest files. The advertisement manifest files may be similar to the manifest files 210, 212, 214, 410, 420, or 430, for example.

Based on content requested from the client device at 910, a content or first manifest file associated with the content may be obtained by the computing environment 110 at 916. This first manifest file may be obtained by a query to the media 126, for example, and may be similar to the manifest files 220, 222, 224, 460, 470, or 480, for example.

After one or more advertisement manifests are identified at 914 and a content or first manifest file is identified at 916, a second manifest file is generated at 918. Generally, the second manifest file is generated by interleaving advertisement clip references from the advertisement manifest among content clip references from the first manifest file. The second manifest file may be generated by the manifest interleaver 142, for example. In certain embodiments, the second manifest file may be rendered into an integrated content stream at 920 by the content render 146, for example, although this step may be omitted. At 922, a manifest map of the second manifest file is generated. The mapper 144 can generate the map, which may be similar to the manifest maps 520 and 712.

At 924, the second manifest file is transmitted to the requesting client device. Additionally or alternatively, the integrated content stream rendered at 920 is transmitted to the requesting client device at 926, although this step may be omitted. At 928, the manifest map generated at 922 is transmitted to the requesting client device.

As the client device requests, receives, and plays back clips of the requested content and the targeted advertisements, ad playback indicators are received at 930 from the client device. The playback indicators are stored and processed, for example, by the playback verifier 148, at 932. As discussed above, the playback verifier 148 may process the playback indicators to determine whether an advertisement has been played back in its entirety, to determine whether a certain number of advertisements have been played back, or based on other processing rules at 932. Other analysis of advertisement playback indicators, as discussed above, may be performed at 932. Based on the processing rules and requirements evaluated at 932, the process proceeds to 934, where a verification of ad playback is transmitted to an advertiser or other entity, for example.

FIG. 10 illustrates a process of injected advertisement playback 1000 according to an example embodiment. At 1010, a client device receives a manifest file, which may be similar to one of the manifest files 310, 320, or 510, for example, including references to clips of advertisements interleaved among references to clips of requested content. The manifest file may be received by any client device such as the client device 160, for example. At 1020, the client device receives a manifest map of the manifest file.

According to the manifest file, the client device requests and begins playback of the clips of content and advertisements referenced in the manifest file at 1030. The request may be made from the client device to another computer, such as the computing environment 110, and the clips may be returned from the computing environment 110, one or more other computers, or a combinations thereof.

At 1040, the client device monitors various parameters including network parameters and computing capacity, for example, as discussed above. In other words, during playback of the content and advertisements referenced in the manifest file, the client device may monitor its own computing capacity and conditions of the network between the client device and the computers that supply the clips of content for playback. Based at least in part on the monitoring at 1040, the client device may select a certain stream of clips from the manifest file at 1050. For example, as discussed above, the manifest file may comprise separate references to clips for high-, medium-, and low-bitrate streams, and the client device may select between those streams based on the monitoring at 1040.

Further, using the manifest map received at step 1020, the client device can enable or disable certain features or functions of the client device or a media player of the client device at 1060, as discussed above. For example, during playback of an advertisement, as noted by the manifest map, a media player of the client device may disable a fast forward function for the duration of playback of an advertisement. Also, based on the manifest map, the client device may transmit ad playback indicators at 1070, at certain timings with reference to request and/or playback of advertisement clips.

Figure 11:
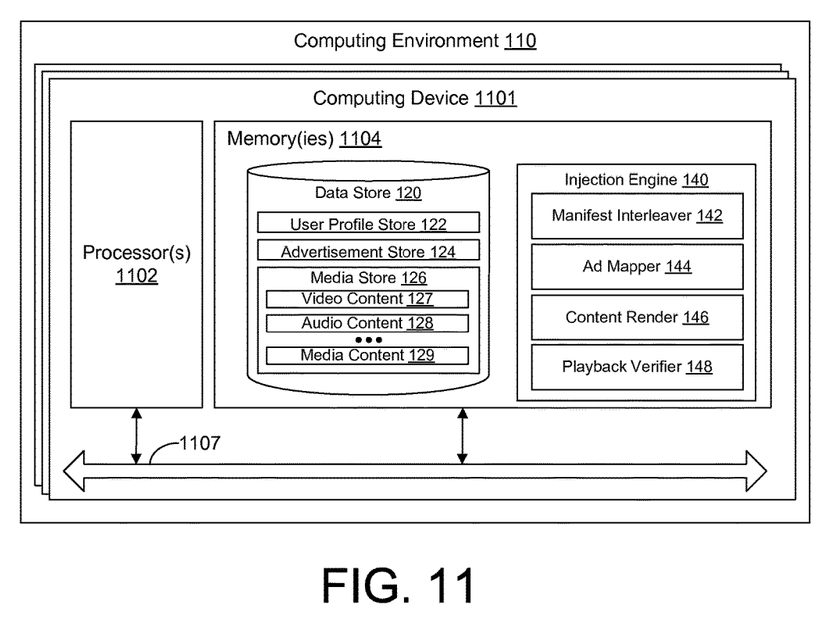
FIG. 11 illustrates a schematic block diagram that provides one example illustration of a computing environment employed in the networked environment of FIG. 1 according to various embodiments of the present disclosure.

FIG. 11 illustrates an example schematic block diagram of the computing environment 110 employed in the networked environment 100 of FIG. 1 according to various embodiments. The computing environment 110 includes one or more computing devices 1101. Each computing device 1101 includes at least one processor circuit, for example, having a processor 1102 and a memory 1104, both of which are coupled to a local interface 1107. To this end, each computing device 1101 may comprise, for example, at least one server computer or similar device. The local interface 1107 may comprise, for example, a data bus with an accompanying address/control bus or other bus structure as can be appreciated.

In various embodiments, the memory 1104 stores data and software or executable-code components executable by the processor 1102. For example, the memory 1104 may store executable-code components associated with the injection engine 140, the media player 162, and the logical elements thereof, for execution by the processor 1102. The memory 1104 may also store data such as that stored in the data store 120, among other data.

It should be understood and appreciated that the memory 1104 may store other executable-code components for execution by the processor 1102. For example, an operating system may be stored in the memory 1104 for execution by the processor 1102. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

As discussed above, in various embodiments, the memory 1104 stores software for execution by the processor 1102. In this respect, the terms "executable" or "for execution" refer to software forms that can ultimately be run or executed by the processor 1102, whether in source, object, machine, or other form. Examples of executable programs include, for example, a compiled program that can be translated into a machine code format and loaded into a random access portion of the memory 1104 and executed by the processor 1102, source code that can be expressed in an object code format and loaded into a random access portion of the memory 1104 and executed by the processor 1102, or source code that can be interpreted by another executable program to generate instructions in a random access portion of the memory 1104 and executed by the processor 1102, etc. An executable program may be stored in any portion or component of the memory 1104 including, for example, a random access memory (RAM), read-only memory (ROM), magnetic or other hard disk drive, solid-state, semiconductor, or similar drive, USB flash drive, memory card, optical disc (e.g., compact disc (CD) or digital versatile disc (DVD)), floppy disk, magnetic tape, or other memory component.

In various embodiments, the memory 1104 may include both volatile and nonvolatile memory and data storage components. Volatile components are those that do not retain data values upon loss of power. Nonvolatile components are those that retain data upon a loss of power. Thus, the memory 1104 may comprise, for example, a random access memory (RAM), read-only memory (ROM), magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may comprise, for example, a static random access memory (SRAM), dynamic random access memory (DRAM), or magnetic random access memory (MRAM), and/or other similar memory device. The ROM may comprise, for example, a programmable read-only memory (PROM), erasable programmable read-only memory (EPROM), electrically erasable programmable read-only memory (EEPROM), or other similar memory device.

Also, the processor 1102 may represent multiple processors 1102 and/or multiple processor cores and the memory 1104 may represent multiple memories that operate in parallel, respectively, or in combination. Thus, the local interface 1107 may be an appropriate network or bus that facilitates communication between any two of the multiple processors 1102, between any processor 1102 and any of the memories 1104, or between any two of the memories 1104, etc. The local interface 1107 may comprise additional systems designed to coordinate this communication, including, for example, a load balancer that performs load balancing. The processor 1102 may be of electrical or of some other available construction.

As discussed above, the injection engine 140, the media player 162, and the logical elements thereof may be embodied in software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 9 and 10 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 1102. The machine code may be converted from the source code, etc. Further, each block may represent, or be connected with, a circuit or a number of interconnected circuits to implement a certain logical function or process step.

Although the flowcharts or process diagrams of FIGS. 9 and 10 illustrate a specific order, it is understood that the order may differ from that which is depicted. For example, an order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the injection engine 140, the media player 162, and the logical elements thereof, that comprise software or executable-code components can be embodied or stored in any tangible or non-transitory computer-readable medium or device for use by or in connection with an instruction execution system such as, for example, the processor 1102. In this sense, the logic may comprise, for example, software or executable-code components that can be fetched from the computer-readable medium and executed by the instruction execution system. Thus, the instruction execution system may be directed by execution of the instructions to perform certain processes such as those illustrated in FIGS. 9 and 10. In the context of the present disclosure, a "computer-readable medium" can be any tangible medium that can contain, store, or maintain any logic, application, software, or executable-code component described herein for use by or in connection with an instruction execution system.

The computer-readable medium can comprise any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may comprise a random access memory (RAM) including, for example, a static random access memory (SRAM), dynamic random access memory (DRAM), or magnetic random access memory (MRAM). In addition, the computer-readable medium may comprise a read-only memory (ROM), a programmable read-only memory (PROM), an erasable programmable read-only memory (EPROM), an electrically erasable programmable read-only memory (EEPROM), or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A non-transitory computer-readable medium embodying a program that, when executed by at least one computing device, directs the at least one computing device to at least:
    access a user database according to a user identifier received from a client device;
    identify at least one advertisement manifest including references to clips of an advertisement and interactive content instructions to direct the client device to present a user interface element for interaction with the advertisement;

obtain a content manifest including references to clips of content based on a request from the client device;

generate an interleaved manifest file by interleaving the references to clips of the advertisement and the interactive content instructions among the references to clips of the content requested from the client device;

generate a manifest file map comprising a plurality of map markers, the plurality of map markers indicating which clips in the interleaved manifest file correspond to the advertisement and to the content, respectively, and at least one of the plurality of map markers indicating a position of at least one of the clips of the advertisement relative to a total length of the advertisement; and transmit the interleaved manifest file and the manifest file map to the client device in reply to the request from the client device, wherein at least one of the at least one computing device or the client device is directed to monitor a network bandwidth and select at least one of the references to clips of the content in the interleaved manifest file in response to the network bandwidth.

2. The non-transitory computer-readable medium of claim 1, wherein the program further directs the at least one computing device to:

generate a content stream based on the interleaved manifest file; and transmit the content stream to the client device.

3. The non-transitory computer-readable medium of claim 1, wherein the program further directs the at least one computing device to:

receive, from the client device, an indicator that a clip of the advertisement has been requested from or played by the client device; and transmit an acknowledgment that the clip of the advertisement has been requested or played, at a predetermined timing after receipt of the indicator.

4. A system, comprising:

at least one computing device; and an application stored on at least one memory device that, when executed by the at least one computing device, directs the at least one computing device to at least:

receive a request for content and contextual information from a client device;

identify an advertisement manifest based on the contextual information, the advertisement manifest including a plurality of references to clips of an advertisement at different playback qualities of the advertisement;

obtain a first manifest file associated with the request for content, the first manifest file including a plurality of references to content at different playback qualities of the content;

generate a second manifest file by interleaving the plurality of references to the clips of the advertisement at different playback qualities among the plurality of references to the clips of the content at different playback qualities;

generate a manifest file map comprising a plurality of map markers, the plurality of map markers indicating which clips in the second manifest file correspond to the advertisement and to the content, respectively, and at least one of the plurality of map markers indicating a position of at least one of the clips of the advertisement relative to a total length of the advertisement; and transmit the second manifest file and the manifest file map to the client device, wherein at least one of the at least one computing device or the client device is directed to monitor a network bandwidth and select at least one of the plurality of references to the clips of the content in the second manifest file in response to the network bandwidth.

5. The system of claim 4, wherein the contextual information is associated with a profile of a user of the client device, and the advertisement comprises a video, audio, or interactive advertisement.

6. The system of claim 4, wherein the contextual information comprises an identifier of a user of the client device; and the at least one computing device is further directed to access a user database according to the identifier to identify a plurality of ad targeting segments for the user based on a profile of the user.

7. The system of claim 4, wherein the advertisement manifest further comprises interactive content associated with the advertisement; and the interactive content includes instructions to direct the client device to present a user interface element for interaction with the advertisement.

8. The system of claim 4, wherein the manifest file map indicates the position of the at least one of the clips of the advertisement among to the clips of the content in the second manifest file.

9. The system of claim 4, wherein at least one of the at least one computing device or the client device is further directed to select at least one of the plurality of references to clips of the advertisement in the second manifest file in response to the network bandwidth.

10. The system of claim 4, wherein the at least one computing device is further configured to:

identify a plurality of advertisements based on the contextual information; and interleave the plurality of references to clips of the advertisement among the plurality of references to the clips of the content according to a list of points within the first manifest file to insert advertisements.

11. The system of claim 4, wherein the at least one computing device is further configured to:

generate a content stream based on the second manifest file; and transmit the content stream to the client device.

12. The system of claim 4, wherein the at least one computing device is further configured to:

receive, from the client device, an indicator that a clip of the advertisement has been requested or played back; and transmit an acknowledgment that the clip of the advertisement has been requested or played back, at a predetermined timing after receipt of the indicator.

13. A method, comprising:

receiving, by at least one computing device, a request for content and contextual information associated with a profile of a user of a client device;

identifying, by the at least one computing device, an advertisement manifest based on the contextual information, the advertisement manifest including a plurality of references to clips of an advertisement at different playback qualities of the advertisement;

obtaining, by the at least one computing device, a first manifest file associated with the request for content, the first manifest file including a plurality of references to content at different playback qualities of the content;

generating, by the at least one computing device, a second manifest file by interleaving the plurality of references to the clips of the advertisement at different playback qualities among the plurality of references to the clips of the content at different playback qualities;

generating, by the at least one computing device, a manifest file map comprising a plurality of map markers, the plurality of map markers indicating which clips in the second manifest file correspond to the advertisement and to the content, respectively, and at least one of the plurality of map markers indicating a position of at least one of the clips of the advertisement relative to a total length of the advertisement; and transmitting the second manifest file and the manifest file map to the client device, wherein at least one of the at least one computing device or the client device is directed to monitor a network bandwidth and select at least one of the plurality of references to the clips of the content in the second manifest file in response to the network bandwidth.

14. The method of claim 13, wherein
the contextual information comprises an identifier of the user of the client device; and
the method further comprises accessing a user database according to the identifier to identify a plurality of ad targeting segments for the user.

15. The method of claim 13, wherein
the advertisement manifest further comprises interactive content associated with the advertisement; and
the interactive content includes instructions which direct the client device to present a user interface element for interaction with the advertisement.

16. The method of claim 13, wherein the manifest file map indicates the position of the at least one of the clips of the advertisement among to the clips of the content in the second manifest file.

17. The method of claim 13, further comprising selecting, by at least one of the at least one computing device or the client device, at least one of the plurality of references to clips of the advertisement in the second manifest file in response to the network bandwidth.

18. The method of claim 13, wherein
the identifying comprises identifying a plurality of advertisements based on the contextual information; and
generating the second manifest file further comprises interleaving the plurality of references to clips of the advertisement among the plurality of references to the clips of the content according to a list of points within the first manifest file to insert advertisements.

19. The method of claim 13, further comprising:
receiving, from the client device, an indicator that a clip of the advertisement has been requested or played back; and
at a predetermined timing after receipt of the indicator, transmitting an acknowledgment that the clip of the advertisement has been requested or played back.

20. The method of claim 13, further comprising:
disabling, by the client device, a fast forward feature of a media player of the client device based on the manifest file map.

* * * * *